United States Patent [19]
Tijburg et al.

[11] Patent Number: 5,766,564
[45] Date of Patent: Jun. 16, 1998

[54] PROCESS FOR MAKING ALUMINOSILICATE FOR RECORD MATERIAL

[75] Inventors: Ivo Ignatius Maria Tijburg, Utrecht; Abdullah Konuksever, Amsterdam, both of Netherlands

[73] Assignee: Akzo-PQ Silica VOF, Amersfoort, Netherlands

[21] Appl. No.: 553,620

[22] PCT Filed: May 11, 1994

[86] PCT No.: PCT/EP94/01564

§ 371 Date: Mar. 1, 1996

§ 102(e) Date: Mar. 1, 1996

[87] PCT Pub. No.: WO94/27910

PCT Pub. Date: Dec. 8, 1994

[30] Foreign Application Priority Data

Jun. 1, 1993 [EP] European Pat. Off. .............. 93201552

[51] Int. Cl.$^6$ .............. C01B 33/26; B41M 3/12; B05D 3/02
[52] U.S. Cl. .............. 423/328.1; 423/330.1; 427/150; 427/376.2; 427/383.5
[58] Field of Search .............. 423/328.1, 330.1; 427/150, 152, 376.2, 376.6, 383.5

[56] References Cited

U.S. PATENT DOCUMENTS

| | | | |
|---|---|---|---|
| 2,739,073 | 3/1956 | Bertorelli | 106/288 |
| 3,582,379 | 6/1971 | Hackbarth et al. | 423/330.1 |
| 3,832,327 | 8/1974 | Hackbarth et al. | 423/330.1 |
| 3,881,704 | 5/1975 | Smith | 366/138 |
| 3,915,734 | 10/1975 | Fitton | 106/306 |
| 3,963,640 | 6/1976 | Smith | 252/313 |
| 4,088,449 | 5/1978 | Smith | 423/330.1 |
| 4,122,031 | 10/1978 | Smith | 252/313 |
| 5,063,187 | 11/1991 | Burgfels et al. | 502/71 |
| 5,209,947 | 5/1993 | Taylor et al. | 427/150 |

FOREIGN PATENT DOCUMENTS

| | | | |
|---|---|---|---|
| 812 840 | 9/1974 | Belgium . | |
| 0 369 364 | 5/1990 | European Pat. Off. | B01J 29/28 |
| 0 434 306 | 6/1991 | European Pat. Off. | C41M 5/155 |
| 1 467 003 | 3/1977 | United Kingdom | C09C 1/40 |
| 1 477 557 | 6/1977 | United Kingdom | C01B 33/26 |
| WO 81/03642 | 12/1981 | WIPO | B41M 5/12 |

OTHER PUBLICATIONS

*Abstract*, JO 3193-620-A, dated Dec. 21, 1989.
*Abstract*, JO 3193-621-1, dated Dec. 21, 1989.
*Abstract*, JO 2221-113-A, date Feb. 12, 1989.
*Derwent*, Abstract, JO 2221-113, p. 1 of 1, Feb. 1989.
*International Search Report*, dated Oct. 13, 1994.

*Primary Examiner*—Mark L. Bell
*Assistant Examiner*—Louis M. Troilo
*Attorney, Agent, or Firm*—Ralph J. Mancini; Louis A. Morris

[57] ABSTRACT

A process for the production of an aluminosilicate containing at least 9 weight percent alumina, having a BET surface area of 300–600 m$^2$/g, and an average pore volume of of 0.2–0.5 ml/g is disclosed. The process includes the steps of preparing an aqueous solution comprising at least one metal silicate, adjusting the pH of said aqueous solution comprising at least one metal silicate with a sufficient amount of an aqueous solution comprising at least one aluminum salt to produce an aqueous solution having a pH of 4.4–7.7, precipitating aluminosilicate from the aqueous solution by concurrently dosing additional aqueous solution comprising at least one metal silicate in such a manner such that the pH is maintained at 4.4–7.7, steps (a)–(c) being carried out at a temperature of 0°–80° C. and isolating said aluminosilicate. The aluminosilicate is useful as a pressure sensitive pigment in carbonless copy paper.

12 Claims, 1 Drawing Sheet

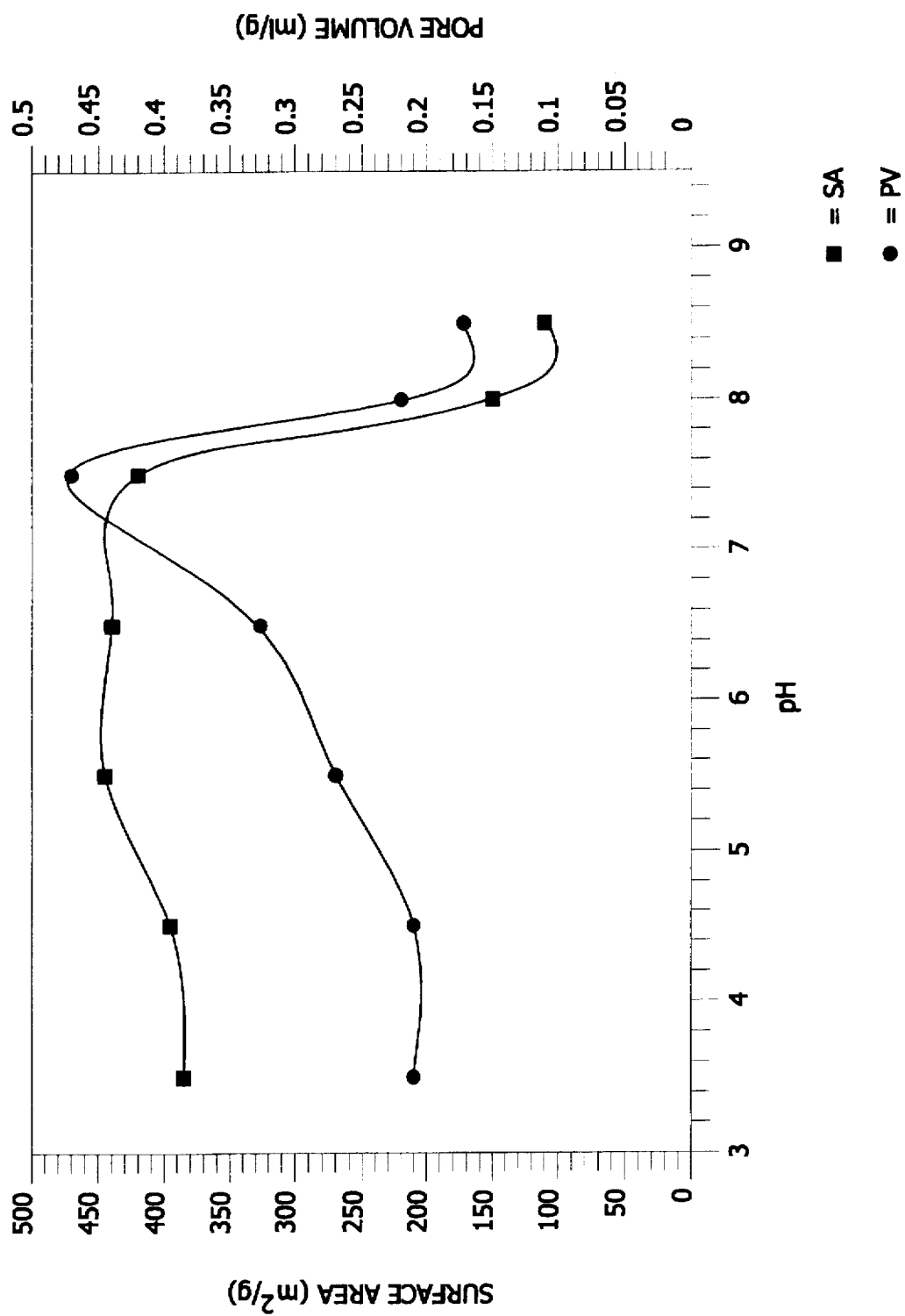

PROCESS FOR MAKING ALUMINOSILICATE FOR RECORD MATERIAL

FIELD OF THE INVENTION

The present invention relates to a process for the production of aluminosilicates and to particular aluminosilicates having a high surface area and alumina content which are produced therefrom.

BACKGROUND OF THE INVENTION

Aluminosilicates useful in copy paper are known from Belgian patent publication 812,140. These aluminosilicates have a surface area of 300–800 $m^2/g$, an average pore volume of 0.5–1 ml/g, an average particle diameter of 3–15 μm, and an alumina content of 7.5–28% by weight. Also disclosed is a process for the production of aluminosilicates which consists of reacting aluminum sulphate and sodium silicate in solution.

U.S. Pat. No. 3,915,734 discloses a sodium aluminosilicate useful as pigments in paper coatings, as fillers in rubber compounds, in inks, paints, plastics and the like. The reaction mixture from which the aluminosilicate is obtained includes an alkali metal silicate, an aluminum salt, and alkaline earth metal salt. The use of a reaction mixture not containing an alkaline earth metal salt in a similar process is mentioned in U.S. Pat. No. 2,739,073.

In a preferred process of U.S. Pat. No. 3,915,734, a portion of the solution of the alkali metal silicate, e.g., sodium meta- or disilicate, is added to the reaction media prior to the introduction of the aluminum salt solution, e.g., aluminum sulphate. In general, the pH should be maintained at 8–12 until all of the alkali metal silicate has been added. The addition of the aluminum salt solution may then be continued until the pH is reduced to 8–10. The temperature of the reaction vessel is maintained at 65° C. throughout the reaction. In Example 4 the aluminum sulphate and sodium silicate solution are added simultaneously while the pH is maintained at 8.0 by adjusting the rate of addition of the two solutions.

The process disclosed in U.S. Pat. No. 3,915,734 differs from the present process in one important respect: the precipitation must be carried out at a pH from 8.0–10.0. This difference is critical since the pH at which precipitation is carried out exerts a strong influence on the properties of the aluminosilicate product.

British patent publication 1,477,557 discloses an aluminosilicate having a surface area of 185–622 $m^2/gram$. A process for making the same consists of mixing at high shear rate concentrated aqueous solutions of alkali metal silicate such as sodium silicate and of a metal salt other than an alkali or alkaline earth metal such as aluminum sulphate. The pH of the resulting aqueous composition is from 2–7.5. Preferably, the alkali metal silicate is sodium silicate and the metal salt is aluminium sulphate. These aluminosilicates can be used in water purification, as fillers in paper and textiles, as coatings for filaments and fibres in synthetic textiles, in the compression moulding industry, in water desalination, and as a filler in soap.

The process of the British patent publication differs from the present process in that it employs a far higher ratio of $SiO_2:Na_2O$ than is used in the present process. Further, this patent does not have as a primary goal the production of high surface area products and thus states that equally good results are obtained at pH 2.5–3.5 as at pH 5.0–6.0 whereas in the present process, pH 2.5–3.5 cannot be successfully employed.

International patent publication WO 8,103,642 describes a record material carrying a colour developer composition comprising a hydrated silica/hydrated alumina composite. A process for making the coated record material consists of reacting hydrated silica and hydrated alumina together in an aqueous medium to produce a dispersion of said composite, applying a coating composition incorporating said composite to a substrate and drying the coated substrate to produce said record material, characterized in that the mean alumina content of the composite on a dried weight basis is up to 7.5%. For example the composite can be prepared by adding together sodium silicate and aluminium sulphate solution, and subsequently reducing the pH to 7.0 by addition of sulphuric acid.

In JO 2221-113, JO 3193-620, and JO 3193-621 a process for the production of aluminosilicate mullite precursors is disclosed. In the process, solutions of aluminum salt and alkali metal silicate are provided to the reaction zone and reacted at a temperature above 80° C. at a pH of 4–10.

European patent application publication 434 306 discloses a process for the production of aluminosilicates and the use of these aluminosilicates in carbonless copy paper. In this process, an acid aluminum salt solution is prepared and then metal silicate solution is added thereto until the pH is 4.0 and aluminosilicate begins to precipitate. Then, the solution is further alkalified with a strong base to a pH of 7 to induce further precipitation of aluminosilicate and separating the aluminosilicate from the reaction media. Notable is that this process requires an additional hydrothermal treatment of the aluminosilicate gel to produce an acceptable product.

The foregoing processes are all suitable for the production of aluminosilicates. However, large variations in the properties of these aluminosilicates are observed when employing these processes. Accordingly, there is a need in the art for a well-defined aluminosilicate production process which provides aluminosilicates having a high alumina content, a high surface area and consistent properties. These aluminosilicates are suitable for the production of record materials such as carbonless copy paper.

It is the primary object of the present invention to provide a well-defined aluminosilicate production process which provides a consistent, high quality aluminosilicate with a high alumina content and a high surface area. It is a further object of the present invention to provide a particular aluminosilicate product which is suitable for use in carbonless copy paper, among other applications. These and other objects of the invention will be apparent from the summary and detailed description which follow.

SUMMARY OF THE INVENTION

The present invention relates to a process for the production of an aluminosilicate containing at least 9 weight percent alumina, having a BET surface area of 300–600 $m^2/g$, and an average pore volume of 0.2–0.5 ml/g. The process comprises the steps of:

a) preparing an aqueous solution comprising at least one metal silicate and having an SiO2:metal oxide molar ratio of 2.8–3.5;

b) adjusting the pH of said aqueous solution comprising at least one metal silicate with a sufficient amount of an aqueous solution comprising at least one aluminum salt to produce an aqueous solution having a pH of 4.4–7.7;

c) precipitating aluminosilicate from the aqueous solution of step (b) by concurrently dosing additional aqueous solution comprising at least one metal silicate and having an SiO2:metal oxide molar ratio of 2.8–3.5, and additional aqueous solution comprising at least one aluminum salt to the aqueous solution of step (b) in such a manner such that the pH is maintained at 4.4–7.7, steps (a)–(c) being carried out at a temperature of 0°–80° C.; and d) isolating said aluminosilicate.

In a second aspect, the present invention relates to an aluminosilicate characterized in that it contains at least 9 weight percent alumina, and it has a BET surface area of 300–600 m²/g, and an average pore volume of of 0.2–0.5 ml/g. In a third aspect, the present invention relates to the use of this aluminosilicate in carbonless copy paper (also known as pressure-sensitive record material).

BRIEF DESCRIPTION OF THE DRAWING

FIG. 1 is a plot of the pore volume and surface area of the aluminosilicate products against the pH at which the precipitation reaction is carried out.

DETAILED DESCRIPTION OF THE INVENTION AND PREFERRED EMBODIMENTS

In the first step of the present process, an aqueous solution of at least one metal silicate is prepared. This aqueous solution has an SiO₂:metal oxide molar ratio of 2.8–3.5, and, more preferably, 3.0–3.4. The solution generally has a solids content in the range of 0.1–20% and more preferably in the range of 1–10% by weight of the total solution. Particularly preferred solids contents are from 2–5% by weight. Such solutions are commercially available, but generally having a solids content of 35–50%. A simple dilution of these higher solids solutions gives a suitable starting solution for the present process.

The preferred metal silicate solution is a solution of sodium silicate. Other metal silicates can also be used such as potassium silicate, for instance. The metal silicate solution, generally having a pH of 10–11, can be used as is in the process of the present invention or can be alkalified by addition of a strong base such as sodium hydroxide, thereby permitting a larger addition of acidic aluminum salt to the metalsilicate solution without lowering the pH to an undesirably low level.

In the second step of the process, the pH of the metal silicate solution is adjusted to 4.4–7.7 by addition of an acidic aluminum salt solution thereto. The more preferred pH range is from 5.0–7.5, and most preferred is from 5.5–6.5. The quantity of aluminum salt solution required will depend upon the initial pH of the metal silicate solution and whether it was alkalified, as well as on the pH of the aluminum salt solution and the pH desired for the particular reaction conditions. It is also possible to adjust the pH of the aluminum salt solution, for example with sulfuric acid, prior to its addition to the metal silicate solution.

This pH adjustment step can also be performed by simultaneous addition of aluminum salt solution and additional metal silicate solution so long as the net result is a pH reduction of the metal silicate solution into the desired pH range. In addition, some precipitation will be observed during the pH adjustment step due to reaction of the aluminum salt with the metal silicate.

The preferred aluminum salt solution is a solution of aluminum sulphate, although other aluminum salts can also be employed. The aluminum salt solution is generally employed in a concentration of 3–20 percent $Al_2O_3$ by weight of the total solution, and more preferably in a concentration of 5–15%.

The third step in the process of the present invention is the precipitation of aluminosilicate from the aqueous solution having a pH of 4.4–7.7 obtained from the second step in the process. The aluminosilicate is precipitated by concurrently dosing additional aluminum salt solution and additional metal silicate solution in such a manner as to maintain the pH of the reaction media at 4.4–7.7. The metal silicate solution generally has a solids content in the range of 5–50% and more preferably in the range of 10–35% by weight of the total solution. Particularly preferred solid contents are from 20–30% by weight.

The preferred dosing method is the simultaneous dosing of metal silicate and aluminum salt solutions in amounts, relative to one another, that will maintain the pH in the desired range. Even more preferred is to dose the metal silicate solution at a constant rate of 0.1–10 weight percent per minute, based on the weight of the initial metal silicate solution prepared in the first step of the process and to then adjust the dosing rate of aluminum salt solution so as to maintain the pH in the desired range. An even more preferred metal silicate dosing rate is from 0.5–5.0 weight percent per minute, based on the weight of the initial metal silicate solution prepared in the first step of the process.

The first three steps of the process of the present invention are carried out at a temperature of 0°–80° C. and more preferably at 20°–60° C. While the temperature has some influence on the properties of the final product, other parameters can be adjusted to modify the properties if it is desired to perform the process at a particular temperature. Typical reaction times for the third step in the process range from 1–4 hours and, more preferably from 2–3.5 hours.

Once the precipitation step is completed the aluminosilicate product is isolated from the aqueous reaction medium. This is conveniently done by filtration, for example, in a standard plate filter press.

Generally, the product is washed to remove impurities and, in particular, unreacted metal silicate and sodium sulfate therefrom. The type and degree of washing will generally be dictated by the product specifications and economic factors. Washing is generally done with water, and preferably demineralized water, and repeated several times until the concentration of dissolved salts in the wash water is reduced to a minimum. Once washing is complete a wet filter cake is obtained.

More preferably, washing of the filter cake is generally done with water. After having reduced the concentration of dissolved salts in the wash water to a minimum, the filter cake can be washed with an ammonium salt solution, e.g. ammonium sulfate or ammonium chloride. This is done when a sodium-free aluminosilicate is required. To remove the excess of ammonium salts, the filter cake is washed again with water. Once washing is complete a wet filter cake is obtained, which is dried by conventional means. To remove ammonia from the surface of the dried aluminosilicate, the product can be calicined in air at elevated temperatures (300°–700° C.).

The filter cake is then broken up and dried by conventional means. One drying method employs a fluidized bed dryer and temperatures of 130°–160° C. A more preferred drying method employs a flash dryer, an inlet temperature of about 350° C. and an outlet temperature of 120° C.

Once drying is complete, the dried product is mechanically broken into small particles by, for example, milling in a hammer mill and/or by slurrying the product and using a ball mill. The aluminosilicate is generally milled to an average particle size of 1-15 μm and, more preferably, 4-12 μm. The resultant product may be dried and sold in bags or can be slurried and transported in tanks.

The aluminosilicate product is useful in carbonless copy paper as a pressure sensitive pigment, as well as in coatings and other typical applications of aluminosilicates. p The aluminosilicate product of the present invention contains at least 9 weight percent alumina, more preferably from 9-15 weight percent alumina and, most preferably, 10-14 weight percent of the aluminosilicate is alumina.

The aluminosilicate product has a BET surface area of 300-600 $m^2/g$ and, more preferably, the BET surface area is from 400-550 $m^2/g$. The aluminosilicate also has an average pore volume of of 0.2-0.5 ml/g., and, more preferably, from 0.25-0.4 ml/g.

More preferred aluminosilicates are also characterized by having an average particle size of 1-15 μm and more preferably, 5-12 μm; a DBP oil absorption of 50-200 ml/100 g and, more preferably, 80-150 ml/100 g; and the pH of a 2% by weight solution of the aluminosilicate in demineralized water is 8.5-11.0 and, more preferably, 9-10.

The invention will be further illustrated by the following examples in which all percentages are percentages by weight.

Examples 1-21 and Comparative Examples A-P

Several different aluminosilicate products were prepared by essentially the same process varying only the dosing time, temperature, pH, $SiO_2$:$Na_2O$ molar ratio and washing conditions. The production process used was essentially as follows.

In a 20 liter RVS reactor, was placed 7 liters of demineralized water at the desired reaction temperature (20° or 60° C.). To this water was added 500 grams of concentrated sodium silicate solution (27.5% $SiO_2$) whereby a pH between 10-11 was obtained. Thereafter, the pH was lowered to the desired pH (see Table 1) by addition of aluminum sulfate solution (8% aluminum oxide) over a period of about 20 minutes (about 225 grams for an $SiO_2$:$Na_2O$ ratio of 3.3).

Thereafter, over the dosing period specified in Table 1, additional aluminum sulphate (typically 2.6 kg of solution) and sodium silicate solutions (typically 8.58 kg of a diluted solution containing ½water and concentrated sodium silicate solution) were added to the reactor contents. The sodium silicate solution was added at a constant rate and the pH was held at the value listed in Table 1 by adjusting the rate of addition of the aluminum sulphate solution.

At the end of the dosing step, the precipitate was separated by filtration and washed free of salts by repeated washings with demineralized water. Finally, the aluminosilicate product was dried in a flash dryer at an inlet temperature of 350° C. and an outlet temperature of 120° C. The dried product was milled in a hammer mill. The properties of the end products can be found in Table 1.

TABLE 1

| Example | Dosing Time (min) | Temperature (°C.) | pH | $SiO_2$/$Na_2O$ molar ratio | Surface Area (BET) ($m^2$/g) | $N_2$ Pore Volume (ml/g) | Particle Size d50 (μm) | Alumina (wt. %) | DBP oil absorption (ml/100 g) | pH (2%-solution) |
|---|---|---|---|---|---|---|---|---|---|---|
| 1 | 120 | 60 | 7.5 | 3.3 | 419 | 0.47 | 5.0 | 11.6 | 156 | 9.3 |
| 2 | 90 | 60 | 7.5 | 3.3 | 318 | 0.40 | 6.0 | — | 149 | 10.3 |
| 3 | 191 | 60 | 6.5 | 3.3 | 454 | 0.31 | 7.26 | 11.2 | 112 | 9.7 |
| 4 | 120 | 60 | 6.5 | 3.3 | 377 | 0.29 | 5.9 | 11.3 | 111 | 9.7 |
| 5 | 120 | 60 | 5.5 | 3.3 | 446 | 0.27 | 11.2 | 11.3 | — | 9.7 |
| 6 | 120 | 20 | 7.5 | 3.3 | 517 | 0.46 | 7.6 | 10.2 | 131 | 10.2 |
| 7 | 120 | 60 | 4.5 | 3.3 | 393 | 0.21 | 11.8 | 11.4 | — | 9.3 |
| 8 | 120 | 20 | 7.5 | 3.3 | 378 | 0.26 | 7.61 | 11.7 | — | — |
| 9 | 120 | 60 | 6.5 | 3.3 | 444 | 0.33 | 6.42 | 10.8 | 114 | 9.6 |
| 10 | 86 | 60 | 6.5 | 3.3 | 409 | 0.31 | 6.28 | 10.8 | 111 | 9.7 |
| 11 | 191 | 60 | 5.5 | 3.3 | 460 | 0.27 | 7.42 | 10.7 | 100 | 9.5 |
| 12 | 86 | 60 | 5.5 | 3.3 | 391 | 0.24 | 7.16 | 10.6 | 110 | 9.5 |
| 13 | 429 | 60 | 5.5 | 3.3 | 357 | 0.22 | 7.35 | 10.6 | — | 9.2 |
| 14 | 120 | 60 | 5.5 | 3.3 | 363 | 0.23 | 7.03 | 10.5 | 90 | 9.0 |
| 15 | 120 | 60 | 6.5 | 3.3 | 411 | 0.33 | 5.98 | 10.5 | 118 | 9.2 |
| 16 | 120 | 60 | 5.5 | 3.3 | 449 | 0.27 | 7.06 | 10.4 | 97 | 9.1 |
| 17 | 191 | 60 | 4.5 | 3.3 | 444 | 0.25 | 7.39 | 11.0 | 78 | 8.5 |
| 18 | 191 | 20 | 6.5 | 3.3 | 441 | 0.30 | 6.34 | 10.8 | 115 | 8.9 |
| 19 | 120 | 60 | 5.5 | 3.3 | 509 | 0.34 | 6.28 | 10.9 | 113 | 8.7 |
| 20 | 120 | 60 | 6.6 | 3.3 | 418 | 0.33 | 5.67 | 10.8 | 117 | 8.6 |
| 21 | 120 | 60 | 6.6 | 3.3 | 365 | 0.33 | 6.35 | 10.6 | 123 | 9.1 |
| A | 150 | 60 | 7.5 | 3.3 | 222 | 0.26 | 8.0 | — | — | 9.7 |
| B | 120 | 60 | 7.5 | 2.0 | 62 | 0.10 | 6.6 | — | 112 | 9.8 |
| C | 120 | 60 | 7.5 | 2.6 | 138 | 0.13 | 7.2 | 14.0 | 105 | 10.0 |
| D | 120 | 20 | 7.5 | 2.0 | 178 | 0.18 | 5.7 | 16.0 | 99 | 9.9 |
| E | 120 | 20 | 7.5 | 2.6 | 258 | 0.22 | 5.7 | 14.0 | 105 | 10.1 |
| F | 120 | 20 | 7.5 | 2.6 | 257 | 0.28 | 10.7 | 12.8 | 135 | 10.2 |
| G | 120 | 20 | 8 → 3.1 | 3.3 | 107 | 0.085 | — | 10.1 | — | 7.4 |
| H | 120 | 20 | 3.9 | 3.3 | 199 | 0.13 | — | 13.9 | — | 5.5 |
| I | 120 | 20 | 4.1 → 4.3 | 3.3 | 51 | 0.04 | — | 6.4 | — | — |
| J | 429 | 60 | 6.5 | 3.3 | 259 | 0.20 | 5.87 | 10.7 | 103 | 9.4 |
| K | 191 | 60 | 7.5 | 3.3 | 256 | 0.26 | 5.18 | 10.6 | 117 | 9.9 |
| L | 191 | 20 | 5.5 | 3.3 | 256 | 0.16 | 5.47 | 10.6 | 68 | 8.8 |
| M | 120 | 20 | 5.5 | 3.3 | 205 | 0.14 | 5.66 | 10.7 | — | 8.7 |
| N | 120 | 20 | 6.5 | 3.3 | 273 | 0.20 | 6.36 | 11.1 | 82 | 8.6 |

TABLE 1-continued

| Example | Dosing Time (min) | Temperature (°C.) | pH | SiO$_2$/Na$_2$O molar ratio | Surface Area (BET) (m$^2$/g) | N$_2$ Pore Volume (ml/g) | Particle Size d50 (μm) | Alumina (wt. %) | DBP oil absorption (ml/100 g) | pH (2%-solution) |
|---|---|---|---|---|---|---|---|---|---|---|
| O | 120 | 60 | 8.5 | 3.3 | 105 | 0.17 | 5.59 | 7.9 | 124 | 10.6 |
| P | 120 | 60 | 7.5 | 3.3 | 283 | 0.39 | 6.2 | 11.0 | 139 | 10.1 |

Notes
[1] Not alkalified
[2] 8.9% SiO$_2$ solution and washed for 2 days
[3] Process begun by adding sodium silicate solution to the aluminum sulphate solution
[4] 4% aluminum sulphate solution employed The pore volume was measured using a modified version of ASTM.D4641-87. More particularly, instead of using the desorption isotherm, the adsorption isotherm was employed. Further, the calculations of pore volume were based on the assumption that the relative pressure (P/P$_o$) was 0.97 rather than the 0.99 in the ASTM method.

In FIG. 1, the pore volume and surface area of the aluminosilicate products are plotted against the pH at which the precipitation reaction is carried out. This figure shows the clear improvement obtained when working at pH's of 4.4–7.7.

The foregoing detailed description and examples of the invention have been presented for the purposes of illustration and description only and are not to be construed as limiting the invention in any way. The scope of the invention is to be determined from the claims appended hereto.

what is claimed is:

1. A process for the production of a non-hydrothermally treated aluminosilicate containing at least 9 weight percent alumina, having a BET surface area of 300–600 m$^2$/g, and an average pore volume of 0.25–0.4ml/g; comprising the steps of:

a) preparing an aqueous solution comprising at least one metal silicate and having an SiO$_2$:metal oxide molar ratio of 2.8–3.5;

b) adjusting the pH of said aqueous solution comprising at least one metal silicate with a sufficient amount of an aqueous solution comprising at least one aluminum salt to produce an aqueous solution having a pH of 4.4–7.7;

c) precipitating the aluminosilicate from the aqueous solution of step (b) by concurrently dosing to the aqueous solution of step (b) additional aqueous solution comprising at least one metal silicate and having an SiO$_2$:metal oxide molar ratio of 2.28–3.5, and additional aqueous solution comprising at least one aluminum salt, in such a manner that the pH is maintained at 4.4–7.7, steps (a)–(c) being carried out at a temperature of 0°–80° C.; and (d) isolating said aluminosilicate.

2. The process of claim 1 which further comprises alkalifying the aqueous solution of step (a) to a pH of 10–11 prior to carrying out step (b) of the process.

3. The process of claim 1 wherein said aqueous solution of at least one metal silicate comprises 0.1–20 weight percent of solids content, and said aqueous solution of aluminum salt comprises an aluminum salt in an amount of 3–20 weight percent.

4. The process of claim 1 wherein said aluminum salt comprises aluminum sulphate and wherein said metal silicate comprises sodium silicate.

5. The process of claim 1 wherein step (d) comprises the step of isolating the aluminosilicate by filtration and further comprising the steps of:

e) washing the aluminosilicate to remove substantially all residual metal silicate and metal sulfate therefrom;

f) drying the aluminosilicate; and g) reducing the altuminosilicate to an average particle size of 1–15 μm.

6. The process of claim 1 wherein the aqueous solution comprising at least one metal silicate is dosed in step (c) at a constant rate of 0.1–10 weight percent per minute, based on the weight of the aqueous solution of step (a), and the rate of addition of the aqueous solution comprising at least one aluminum salt is adjusted to maintain the pH in a range of 4.4 to 7.7.

7. A non-hydrothernally treated aluminosilicate which comprises at least 9 weight percent alumina, and possesses a BET surface area of 300–600 m$^2$/g, and an average pore volume of 0.25–0.4 ml/g.

8. The aluminosilicate of claim 7 which has an average particle size of 1–15 μm and a DBP oil absorption of 50–200 ml/100 g.

9. The aluminosilicate of claim 7 wherein the pH of a 2% by weight solution of said aluminosilicate in demineralized water is 8.5–11.0.

10. An aluminosilicate made by the process of claim 1.

11. Carbonless copy paper which comprises the aluminosilicate of claim 7.

12. The aluminosilicate of claim 10 which comprises at least 9 weight percent alumina and possess a BET surface area of 300–600 M$^2$/g, and an average pore volume of 0.25–0.4 ml/g.

* * * * *